Patented May 6, 1947

2,420,082

UNITED STATES PATENT OFFICE 2,420,082

BITUMINOUS COMPOSITION COMPRISING AN ASPHALT AND A POLYMERIZED ESTER OF METHACRYLIC ACID

Earl W. Klinger, Long Island City, N. Y., assignor to Standard Oil Development Company, a corporation of Delaware No Drawing. Application July 22, 1943, Serial No. 495,780

3 Claims. (Cl. 260—28)

This invention relates to the manufacture of a bituminous composition having improved physical properties and relates particularly to the manufacture of a bituminous composition of improved ductility, pliability and impact at relatively low temperatures.

Some bituminous compositions require a high fusing point so as not to soften in warm weather or in coming in contact with warm substances, but, on the other hand, they must be sufficiently ductile that on expansion or contraction, cracks or openings do not form and when used to coat a pipe or to form pipe seals in the joints of the pipe, they should be of sufficient adhesivity and ductility to enable the pipe to expand or contract without tearing away the bituminous composition from the pipe. They should likewise be sufficiently pliable so that on bending or distortion they do not form cracks and they also are required to be able to withstand rough usage especially when submitted to the impacts of sudden forces that tend to shatter brittle surfaces.

Native asphalts or asphalts prepared from petroleum oils do not always have these desirable properties.

An object of this invention is to manufacture a bituminous composition that will be ductile, pliable and be able to withstand impacts without the formation of cracks in the composition at relatively low temperatures.

According to this invention it is now found that by incorporating relatively small amounts of a synthetic oil-soluble polymerized ester of the acrylic acid of vinyl ester series, the above object is accomplished.

The preformed oil-soluble polymerized ester may be incorporated in the asphalt as such, the oil solution of poly ester may be incorporated in the asphalt or the unpolymerized ester may be incorporated in the asphalt and the ester then polymerized. The amount of the polymerized ester that is to be used may be varied from 1 to 20%. Generally the amount used varies from 2 to 5%. Wetting agents and other ingredients may be incorporated in the said bituminous mixture. The oil-soluble polymerization products of esters having the vinyl or substituted vinyl group that is used according to this invention has the following general formula:

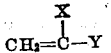

wherein X represents a hydrogen, an alkyl or aromatic hydrocarbon group, Y is

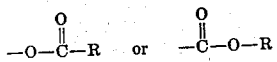

R representing a monovalent hydrocarbon radical containing more than 6 carbon atoms.

The polymers having this general formula are colorless, odorless and stable towards oxidation or storage. The polymerization is controlled so that oil-insoluble polymers are not formed. The oil-soluble polymers that are used according to this invention are the esters of acrylic acid or of its alpha-alkyl or alpha-aryl substitution products and monohydric alcohols containing more than 4 carbon atoms, such as amyl, hexyl, heptyl, octyl, nonyl, decyl, lauryl, myricyl, cetyl, or octadecyl, corresponding esters of alpha-methacrylic acid, alpha-phenylacrylic acid, and other alpha-substituted homologues of acrylic acid. These esters are preferably those of the normal primary saturated aliphatic alcohols, but the analogous esters of the corresponding secondary or of the branched-chain alcohols can also be used. The esters of the above acids of the acrylic series with monohydric aromatic, hydroaromatic, or ether alcohols may also be used, such as the benzyl, cyclohexyl, amylphenyl, n-butyloxyethyl esters. Also the vinyl esters of valeric, keptoic, lauric, palmitic, stearic, n-amyl-benzoic, naphthenic, hexahydrobenzoic, or of n-butyloxybutyric acid can be used. Copolymers of the various esters may likewise be used.

These esters are employed in the form of their oil-soluble polymers which should be as free as possible of unpolymerized monomeric esters, since the presence of unsaturated or volatile compounds in the asphalts is objectionable. Unpolymerized esters can be removed by heating the polymer or the mixture of asphalt and polymer invacuo to a temperature sufficiently high to volatilize the monomeric ester but preferably the polymerization should be carried out as completely as possible and the latter operation dispensed with.

In the following examples, the improvements obtained by the addition of oil-soluble ester polymers are illustrated.

Table I

|  | Example 1 | | Example 2 | |
| --- | --- | --- | --- | --- |
| Per cent Asphalt | 100 | 95 | 100 | 95 |
| N Decyl acrylate | 0 | 5 | 0 | 5 |
| Softening Point, ° F. (B&R) | 171 | 163 | 231 | 237 |
| Penetration at 77° F | 31 | 85 | 16 | 48 |
| Penetration at 32° F | 21 | 65 | 12 | 38 |
| Ductility at 77° F. (cm.) | 4 | 100+ | 2½ | 19 |
| Pliability at 20° F. (degrees), Reeve and Yeager | 9 | 180+ | 10 | 180+ |
| Impact at 20° F. (inches) | 1½ | 15 | 2 | 19+ |
| Ratio of Pen. 77° F./100 g./5% / Pen. 32° F./200 g./60" | 1.5 | 1.3 | 1.3 | 1.3 |

Table II

| Polymer Concentrate of Octyl Methacrylate | | 2 | 5 | | | Typical. |
| --- | --- | --- | --- | --- | --- | --- |
| Polymer Ext. of Decyl-Methacrylate | | | | 2 | 5 | Colombian. |
| Colombian 180/200° St. O. Asphalt, Per cent | 100 | 98 | 95 | 98 | 95 | Coating. |
| Softening Point, ° F | 197 | 206 | 233 | 199 | 217 | 231. |
| Penetration at 77° F | 22 | 19 | 21 | 20 | 24 | 16. |
| Penetration at 32° F | 17 | 16 | 17 | 16 | 20 | 12. |
| Barber Stain | | 3 | 3 | 3 | 3½ | 4. |

The pliability test used is that of Reeve and Yeager. The impact test used is one in which a disc of the bituminous composition 3 inches in diameter and $\frac{7}{16}$ of an inch in thickness is placed on a solid metal plate immersed in a constant temperature bath, over which is placed an anvil 3 inches long and $1\frac{3}{8}$ of an inch in diameter, weighing ½ lb. The end resting on the bituminous disc is semi-spherical and held in a tube 20 inches long of sufficient diameter to allow the anvil to move freely. Another cylinder weighing ½ lb. with a flat end is placed in the cylinder sleeve over the anvil. This second cylindrical weight has flat ends and in carrying out the tests is allowed to drop on to the first weight and the resulting effects on the bituminous disc are noted. The cylinder sleeve is graduated in ½ inches and the distance the second weight is allowed to drop is increased ½ inch after each drop until the disc shows cracks upon impact. The cylinder sleeve being 20 inches long, a greater distance than a 19 inch drop is not used.

I claim:
1. A petroleum bituminous composition comprising an asphalt and an oil-soluble polymerized aliphatic monohydric alcohol ester of methacrylic acid in which the alcohol contains from 8 to 10 carbon atoms, said polymer being present in an amount of from 2 to 5% based on the combined weight of said asphalt and said polymer.

2. A petroleum bituminous composition comprising an asphalt and from 2 to 5% of an oil-soluble polymerized octyl methacrylate, said percentage being based on the combined weight of said asphalt and said polymer.

3. A petroleum bituminous composition comprising an asphalt and from 2 to 5% of an oil-soluble polymerized decyl methacrylate, said percentage being based on the combined weight of said asphalt and said polymer.

EARL W. KLINGER.

REFERENCES CITED

The following references are of record in the file of this patent:

UNITED STATES PATENTS

| Number | Name | Date |
| --- | --- | --- |
| 2,129,662 | Barrett et al. | Sept. 13, 1938 |
| 2,113,114 | Sirot | Apr. 5, 1938 |

FOREIGN PATENTS

| Number | Country | Date |
| --- | --- | --- |
| 404,504 | British | Jan. 18, 1934 |
| 420,564 | British | Dec. 4, 1934 |

OTHER REFERENCES

Spielman, "Bituminous Substances." Pub., 1925, by Ernest Benn, Limited, London. Pages 158–160.